(12) United States Patent
Floe

(10) Patent No.: US 11,613,330 B2
(45) Date of Patent: Mar. 28, 2023

(54) BOW STOP FOR BOATS

(71) Applicant: Wayne Gary Floe, Winter Haven, FL (US)

(72) Inventor: Wayne Gary Floe, Winter Haven, FL (US)

( * ) Notice: Subject to any disclaimer, the term of this patent is extended or adjusted under 35 U.S.C. 154(b) by 88 days.

(21) Appl. No.: 17/486,880

(22) Filed: Sep. 27, 2021

(65) Prior Publication Data

US 2022/0097803 A1 Mar. 31, 2022

Related U.S. Application Data

(60) Provisional application No. 63/083,688, filed on Sep. 25, 2020.

(51) Int. Cl.
*B63B 21/08* (2006.01)
*F16B 7/10* (2006.01)
*B63B 21/00* (2006.01)

(52) U.S. Cl.
CPC ........ *B63B 21/08* (2013.01); *B63B 2021/001* (2013.01); *F16B 7/10* (2013.01)

(58) Field of Classification Search
CPC .............. B63B 21/08; B63B 2021/001; B63B 2021/002; B63B 2021/003; B63B 2021/004; F16B 7/10; F16B 7/1472; F16B 7/187; B63C 3/12
USPC ........... 114/343, 364, 230.1, 230.15, 230.17, 114/230.18, 230.19
See application file for complete search history.

(56) References Cited

U.S. PATENT DOCUMENTS

| | | | | |
|---|---|---|---|---|
| 2,662,501 A * | 12/1953 | Bascome, Jr. | ............ | E02B 3/24 114/230.19 |
| 3,060,885 A * | 10/1962 | Nolf | .......................... | E02B 3/24 114/230.18 |
| 3,177,839 A * | 4/1965 | Nolf | .......................... | E02B 3/24 114/230.18 |
| 3,237,587 A * | 3/1966 | Ross | ....................... | E02B 3/064 405/218 |
| 4,351,259 A * | 9/1982 | Loire | ........................ | E02B 3/24 114/230.19 |
| 5,113,702 A * | 5/1992 | Capps | ....................... | E02B 3/24 405/212 |
| 5,174,234 A * | 12/1992 | Ryan | .......................... | B63C 3/06 114/230.1 |

(Continued)

*Primary Examiner* — Daniel V Venne

(57) ABSTRACT

A bow stop is an apparatus that safely aids in the docking of a boat. The apparatus includes at least tone length-adjustable stopper assembly. The at least one length-adjustable stopper assembly includes a telescopic bar, a stopper tube, a bungee cord, a first cradle mount, and a second cradle mount. The telescopic bar adjusts to the length of a boat. The stopper tube presses against the front of the bow. The bungee cord retracts the stopper tube into a neutral position. The first cradle mount and the second cradle mount secure the telescopic bar, and consequently the stopper tube and the bungee cord with the cradle mount. In a preferred embodiment, the at least one length-adjustable stopper assembly is a left length-adjustable stopper assembly and a right length-adjustable stopper assembly. The preferred embodiment further includes a length-adjustable cable, connecting the left length-adjustable stopper assembly with the right length-adjustable stopper assembly.

20 Claims, 5 Drawing Sheets

(56) References Cited

U.S. PATENT DOCUMENTS

| | | | |
|---|---|---|---|
| 5,441,007 A * | 8/1995 | Hunt | B63B 21/00 114/230.1 |
| 6,000,356 A * | 12/1999 | VanAssche | B63B 21/00 114/230.1 |
| 6,119,616 A * | 9/2000 | Hannasch | B63B 21/00 114/230.1 |
| 7,066,102 B1 * | 6/2006 | Tossavainen | B63B 21/00 114/230.1 |

* cited by examiner

BOW STOP FOR BOATS

The current application claims a priority to the U.S. Provisional Patent application Ser. No. 63/083,688 filed on Sep. 25, 2020. The current application is filed on Sep. 27, 2021 while Sep. 25, 2021 was on a weekend.

FIELD OF THE INVENTION

The present invention generally relates to boat docking equipment. More specifically, the present invention is a bow stop for boats.

BACKGROUND OF THE INVENTION

In order to properly dock a boat, specific equipment and procedures are necessary to not only secure a boat in place but prevent the boat from getting damaged while docking a boat. Boats are typically docked onto platforms or cradle beams that prevent the boat from swaying awhile while not in use. As the cradle beam or platform is positioned underneath the water level so that a boat smoothly rides onto the cradle beam or platform, it may be difficult to precisely position the boat onto the cradle beam or boat.

It is therefore an objective of the present invention to provide a stop for an incoming boat that is ready to be docked. The present invention not only aids in the full stop of a boat onto a cradle beam or platform, but precisely positions the boat onto the cradle beam or platform. Moreover, the present invention absorbs any shock from the force of an incoming boat. In order to effectively utilize the present invention, it is recommended that accurate measurements are taken of the boat so that the present invention may be adjusted to accommodate a specific width and length of the desired boat.

DETAILED DESCRIPTIONS OF THE INVENTION

All illustrations of the drawings are for the purpose of describing selected versions of the present invention and are not intended to limit the scope of the present invention.

Figure 1:
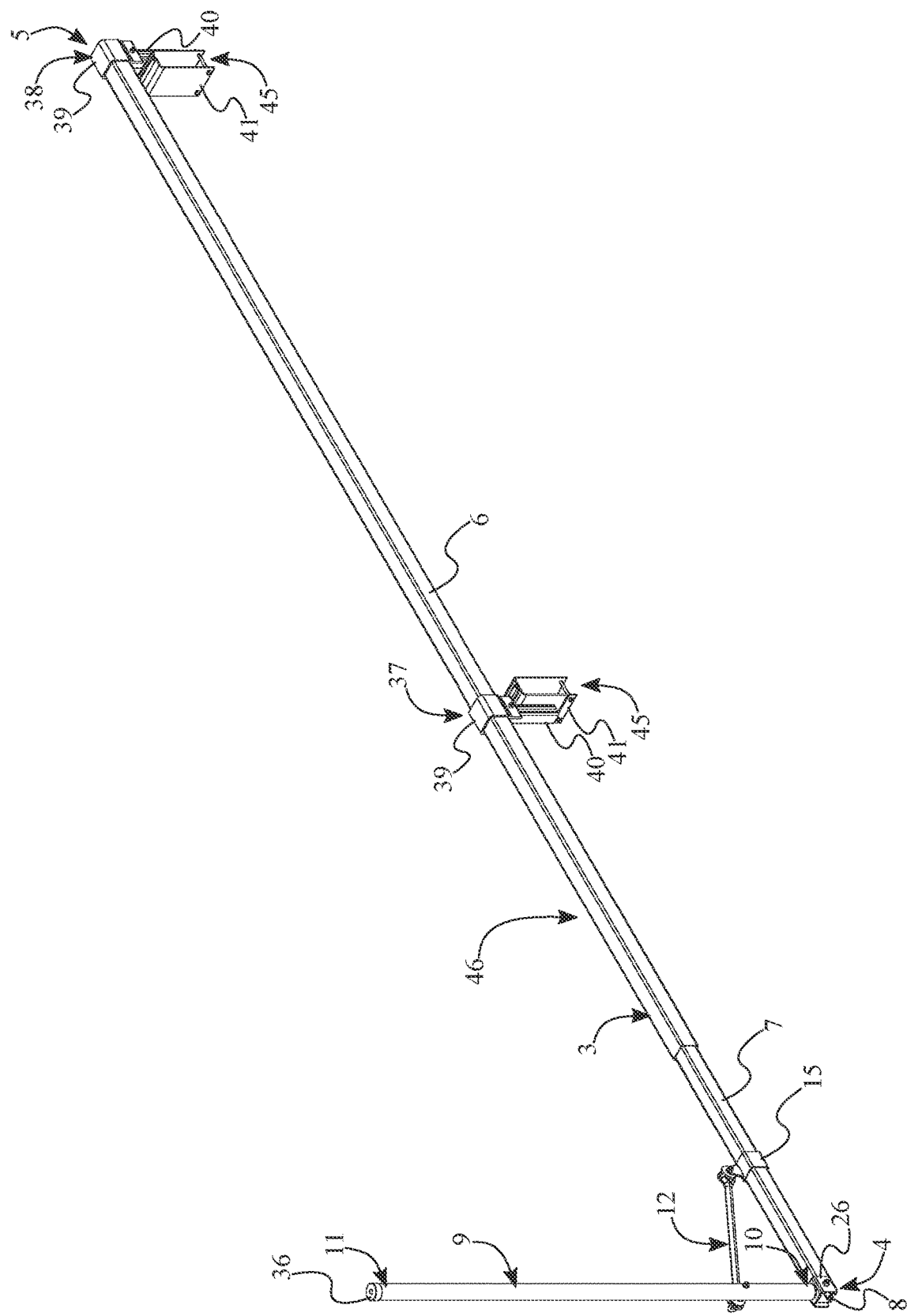
FIG. 1 is a top perspective view of the present invention.

The present invention is a bow stop for boats. In order to properly dock a boat without damaging the boat, the present invention absorbs any shock from the boat entering onto a cradle mount or platform. The present invention gently and effectively stops the bow, and consequently positions the boat onto the cradle mount. The present invention may be utilized with a variety of boats such as a bass boat, a bay boat, a cruiser, and so on. Likewise, the present invention may be secured onto a variety of cradle mounts or platforms. In order for the present invention to be able to stop a variety of boats, the present invention may comprise at least one length-adjustable stopper assembly 46. The at least one length-adjustable stopper assembly 46 may comprise a telescopic bar 3, a stopper tube 9, a bungee cord 12, a first cradle mount 37 and a second cradle mount 38, seen in FIG. 1. The telescopic bar 3 adjusts to the overall length of the boat and upholds the stopper tube 9 in front of the bow. Moreover, the telescopic bar 3 may comprise a proximal bar end 4 and a distal bar end 5. The proximal bar end 4 corresponding to the front or bow of a boat, whereas the distal bar end 5 corresponds to the rear of a boat. The stopper tube 9 presses against the bow and positions the boat properly onto the cradle mount. The stopper tube 9 is preferably a polyvinyl chloride (PVC) pipe. The stopper tube 9 may comprise a proximal tube end 10 and a distal tube end 11. The proximal tube end 10 connects the stopper tube 9 with the telescopic bar 3. The distal tube end 11 defines the height of the stopper tube 9 with the proximal tube end 10. The bungee cord 12 extends and retracts the stopper bar, thereby absorbing any shock from the incoming speed of the boat. The bungee cord 12 may comprise a first cord end 13 and a second cord end 14. The first cord end 13 connects the bungee cord 12 with the telescopic bar 3. The second cord end 14 connects the bungee cord 12 with the stopper tube 9. The first cradle mount 37 and the second cradle mount 38, together, secures the telescopic bar 3 onto the cradle mount and fixed the position of the present invention across the cradle mount.

The overall configuration of the aforementioned components readily receives and stops a boat while docking. In order for the stopper tube 9 to readily receive a boat coming onto a cradle mount or platform, the proximal tube end 10 is hingedly mounted to the proximal bar end 4. The stopper tube 9 is able to pivot, therefore extend and retract, as the first cord end 13 is laterally mounted to the stopper tube 9, offset from the proximal tube end 10, seen in FIG. 1, FIG. 2, and FIG. 3. The second cord end 14 is laterally mounted to the telescopic bar 3, offset from the proximal bar end 4. This arrangement defines the tension of the at least one length-adjustable stopper assembly 46 with the bow of the boat. The stopper tube 9 therefore returns to a neutral position after extending and retracting. In order for the at least one length-adjustable stopper assembly 46 to remain in place while stopping the boat along the cradle mount, the first cradle mount 37 and the second cradle mount 38 are laterally mounted with the telescopic bar 3. More specifically, the first cradle mount 37 is positioned adjacent to the distal bar end 5, and the second cradle mount 38 is positioned offset from the distal bar end 5, providing a stable and balanced connected of the telescopic bar 3 across the cradle mount.

Figure 2:
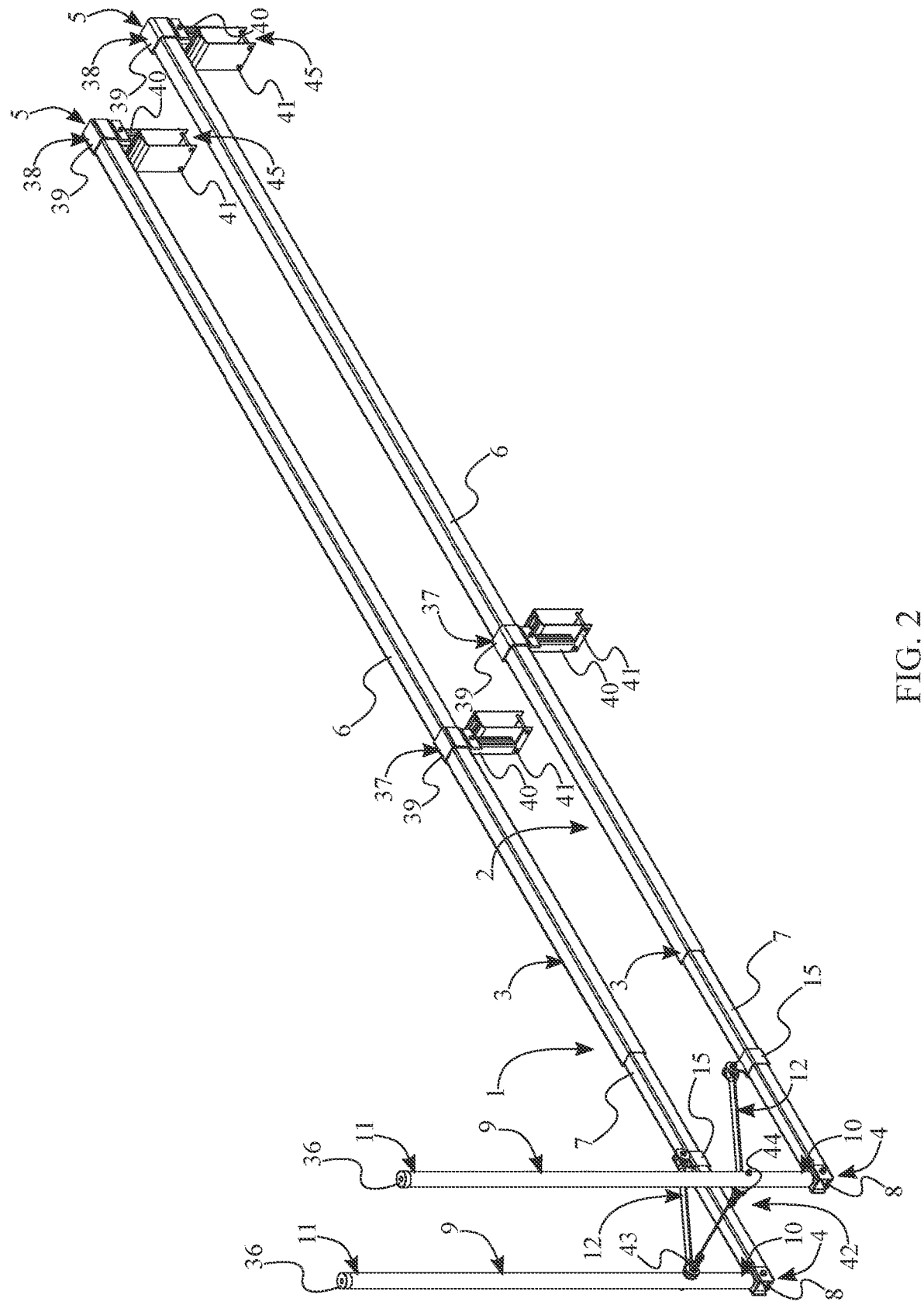
FIG. 2 is a top perspective view of a preferred embodiment of the present invention with at least one length-adjustable stopper assembly as a left length-adjustable stopper assembly and a right length-adjustable stopper assembly.
Figure 4:
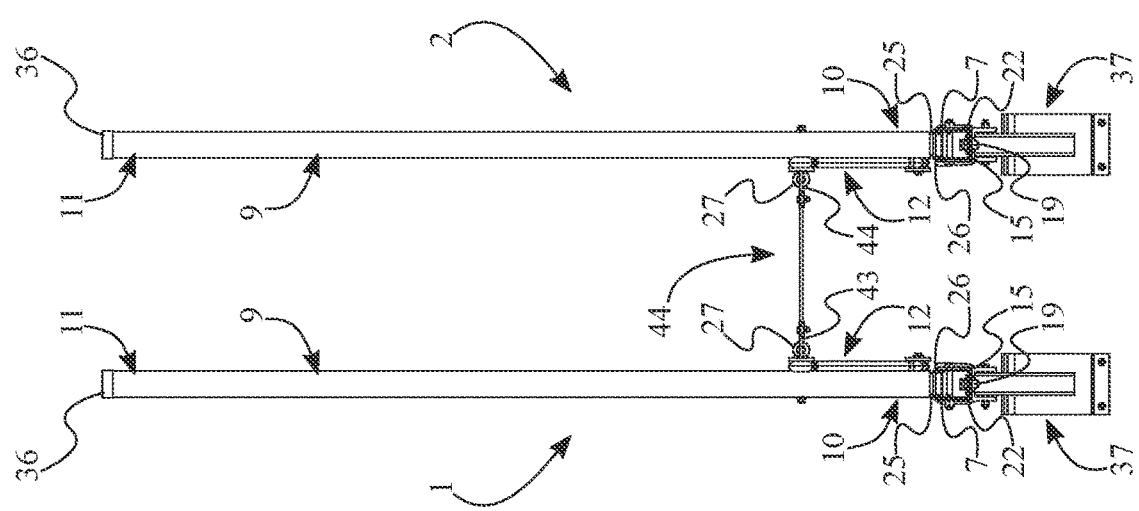
FIG. 4 is a front view of the preferred embodiment of the present invention.
Figure 5:
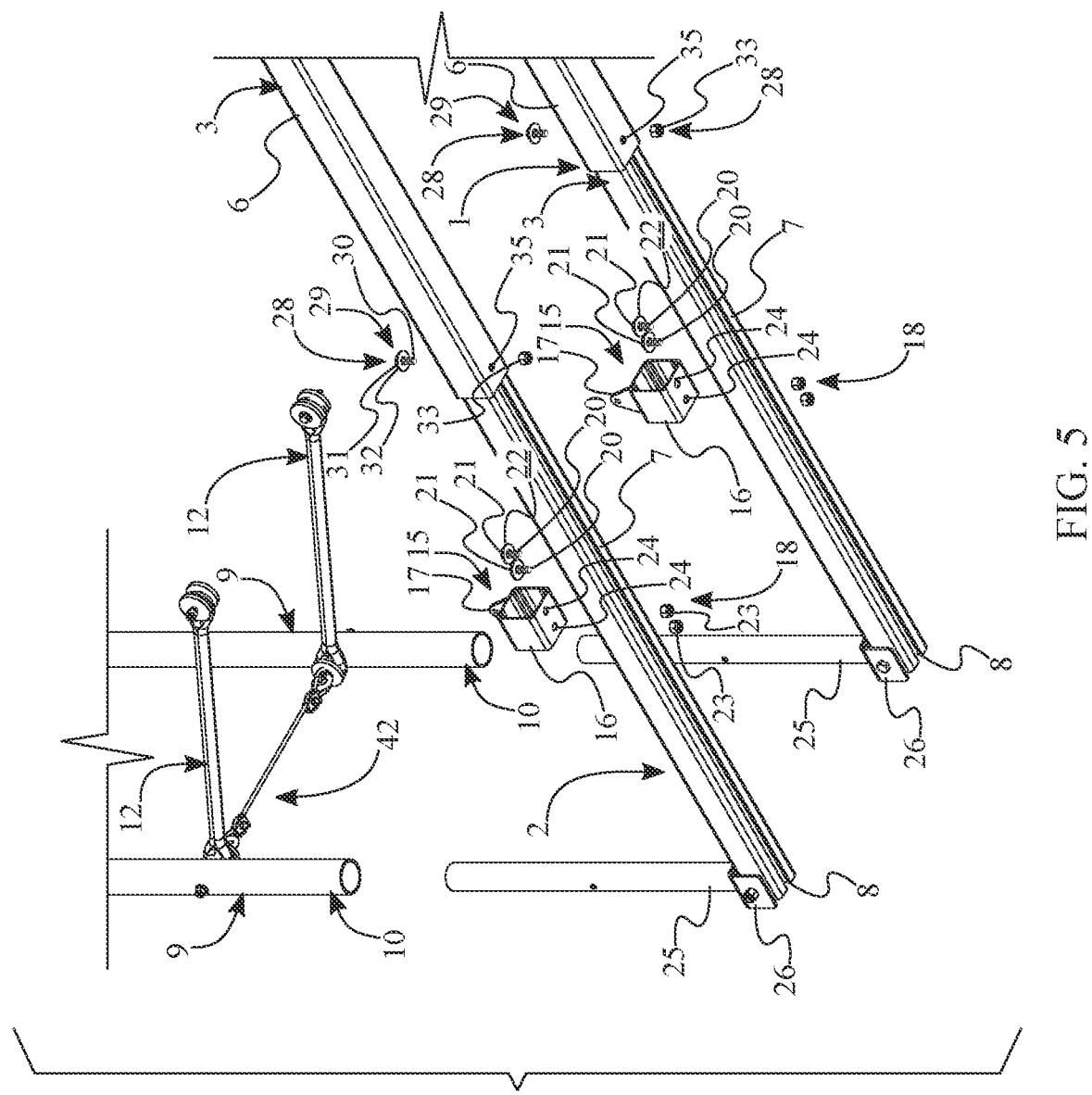
FIG. 5 is an exploded bottom perspective view of the preferred embodiment of the present invention.

In a preferred embodiment of the present invention, the present invention further comprises a length-adjustable cable 42, seen in FIG. 2, FIG. 4, and FIG. 5. In order to effectively stop most boats, the at least one length-adjustable stopper assembly 46 is a left length-adjustable stopper assembly 1 and a right length-adjustable stopper assembly 2. The left length-adjustable stopper assembly 1 presses against the left side of a boat, and the right length-adjustable stopper assembly 2 presses against the right side of the boat. The preferred embodiment evenly stops a boat with a pointed bow, whereas the at least one length-adjustable stopper assembly 46 as a single length-adjustable stopper assembly effectively stops a pontoon boat. Moreover, the left length-adjustable stopper assembly 1 is positioned offset with the right length-adjustable stopper assembly 2. The left length-adjustable stopper assembly 1 and the right length-adjustable stopper assembly 2 simultaneously extend and retract as the stopper tube 9 of the left length-adjustable stopper assembly 1 is tethered to the stopper tube 9 of the right length-adjustable stopper assembly 2 by the length-adjustable cable 42. This arrangement prevents the boat from rotating and evenly stops the boat across the width of the bow.

Furthermore, in the preferred embodiment of the present invention, the at least one length-adjustable stopper assembly 46 further comprises a tensioning junction anchor 27, seen in FIG. 4. The tensioning junction anchor 27 is preferably an eyelet screw that allows both the bungee cord 12 and the length-adjustable cable 42 to be securely connected with the stopper tube 9. The tensioning junction anchor 27 is laterally attached through the stopper tube 9, offset from the proximal tube end 10, maintain a desired orientation of the stopper tube 9 and maintaining the structural integrity of the connection between the stopper tube 9 and the length-adjustable cable 42. The length-adjustable cable 42 is taut between the left length-adjustable stopper assembly 1 and the right length-adjustable stopper assembly 2 as the first cord end 13 is tethered to the tensioning junction anchor 27. More specifically, the tensioning junction anchor 27 of the left length-adjustable stopper assembly 1 is tethered to the tensioning junction anchor 27 of the right length-adjustable stopper assembly 2 by the length-adjustable cable 42.

In order for the length-adjustable cable 42 to be lengthened and shortened depending on the width of the bow or the distance needed between the left length-adjustable stopper assembly 1 and the right length-adjustable stopper assembly 2, the length-adjustable cable 42 may further comprise a first circumference-adjustable loop 43 and a second circumference-adjustable loop 44, seen in FIG. 2 and FIG. 4. The first circumference-adjustable loop 43 and the second circumference-adjustable loop 44 is positioned opposite to each other along the length-adjustable cable 42, preserving a continuous and smooth connection between the left length-adjustable stopper assembly 1 and the right length-adjustable stopper assembly 2. More specifically, the first circumference-adjustable loop 43 is tethered to the stopper tube 9 of the left length-adjustable stopper assembly 1. Likewise, the second circumference-adjustable loop 44 is tethered to the stopper tube 9 of the right length-adjustable stopper assembly 2.

In order for the bungee cord 12 to be secured with the telescopic bar 3, the at least one length-adjustable stopper assembly 46 may further comprise a bungee clamp 15 and a first fastening mechanism 18, seen in FIG. 1, FIG. 2, FIG. 3, FIG. 4, and FIG. 5. The bungee clamp 15 facilitates any pivoting of the second cord end 14 as the stopper tube 9 extends and retracts. The first fastening mechanism 18 secures the desired position of the bungee clamp 15 along the telescopic bar 3, thereby increasing or decreasing the tension of the bungee cord 12 with the stopper tube 9, and consequently the force of the retraction of the stopper tube 9. In the preferred embodiment of the present invention, the telescopic bar 3 further comprises an outer tube 6 and an inner tube 7. The outer tube 6 and the inner tube 7, together, define the overall length of the telescopic bar 3 and corresponds to the length of a boat. The overall length is adjustable as the inner tube 7 is telescopically engaged within the outer tube 6. More specifically, the proximal bar end 4 is positioned coincident with the inner tube 7, opposite the outer tube 6. Conversely, the distal bar end 5 is positioned coincident with the outer tube 6, opposite the inner tube 7. In order to orient the stopper tube 9, the bungee clamp 15 is positioned in between the outer tube 6 and the proximal bar end 4. The bungee clamp 15 is operatively coupled with the inner tube 7 by the first fastening mechanism 18, wherein the first fastening mechanism 18 is used to selectively lock and unlock the bungee clamp 15 in place along the inner tube 7. This arrangement allows the position of the bungee clamp 15 to be adjusted, as well as the tension of the bungee cord 12. More specifically, the second cord end 14 is laterally attached to the inner tube 7 by the bungee clamp 15.

The structural integrity of the at least one length-adjustable stopper assembly 46 is maintained while extending and retracting as the at least one length-adjustable stopper assembly 46 may further comprise a pole 25 and a first U-shaped bracket 26, seen in FIG. 5. The pole 25 secures and orients the stopper tube 9 with the first U-shaped bracket 26. The first U-shaped bracket 26 connects the pole 25 with the telescopic bar 3 and allows the pole 25 to pivot forwards and backwards. The stopper tube 9 remains connected with the telescopic bar 3 while extending and retracting as the first U-shaped bracket 26 is terminally fixed with the pole 25, and the pole 25 is frictionally engaged into the proximal tube end 10. It is understood that additional fasteners, such as a screw or eyelet, may be utilized to further fix the stopper tube 9 around the pole 25. The bungee cord 12 remains taut while in a neutral position as the first U-shaped bracket 26 is laterally positioned about the inner tube 7, offset from the bungee clamp 15. Moreover, the first U-shaped bracket 26 is hingedly connected to the inner tube 7, accommodating the pivoting movement of the stopper tube 9 while not in a neutral position.

Figure 3:
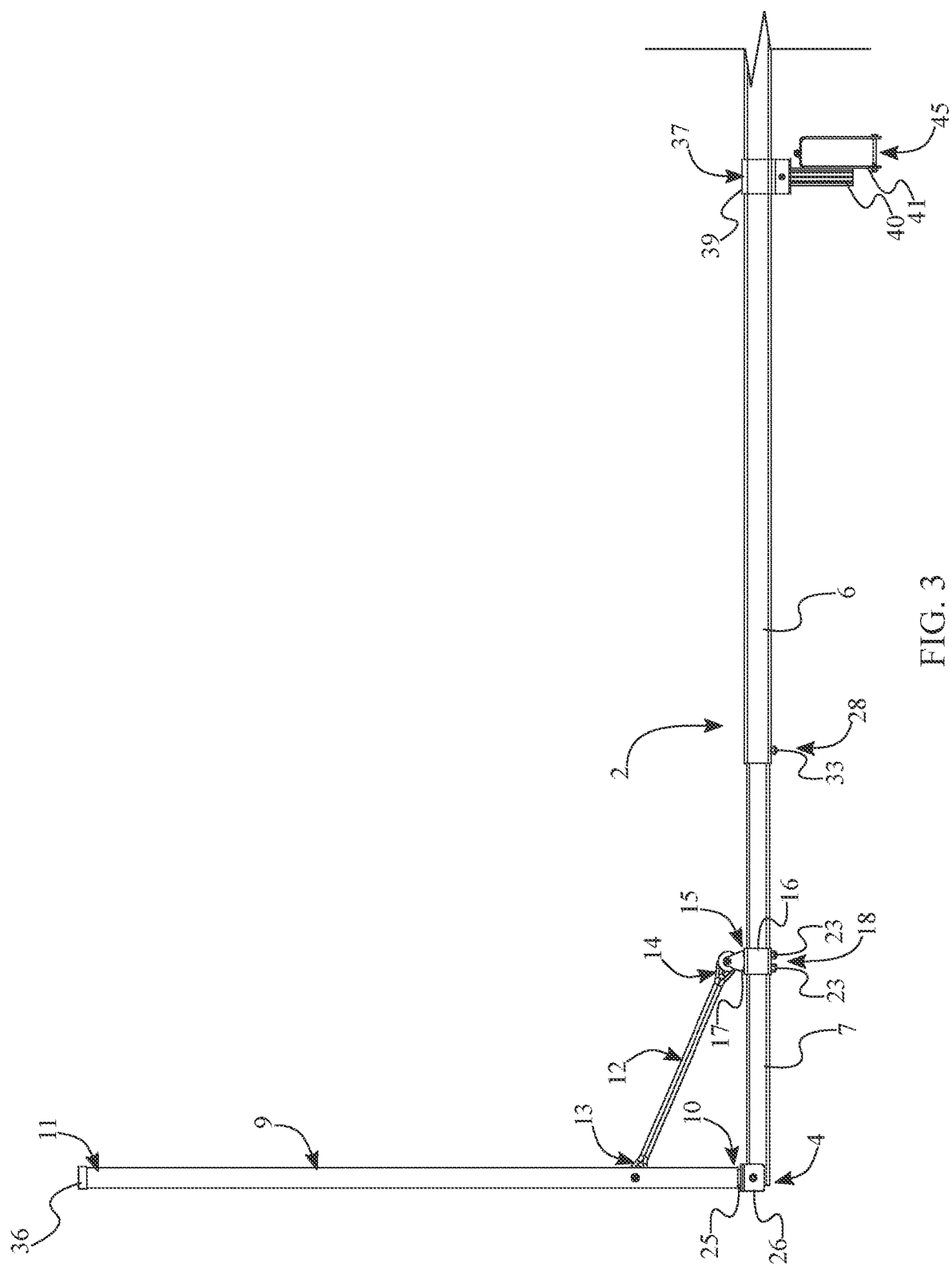
FIG. 3 is a side view of the preferred embodiment of the present invention.

In order to ensure the connection between the bungee cord 12 and the telescopic bar 3, the bungee clamp 15 may comprise a square-shaped clamp 16 and a connector plate 17, seen in FIG. 3 and FIG. 5. The square-shaped clamp 16 positions the connector plate 17 along the telescopic bar 3. The connector plate 17 allows the bungee cord 12 to connect with the square-shaped clamp 16. The square-shaped clamp 16 is laterally positioned around the inner tube 7 and is slidably engaged along the inner tube 7, thereby maintaining a smooth linear path for the bungee cord 12 between the telescopic bar 3 and the stopper tube 9. Moreover, the connector plate 17 is externally fixed with the square-shaped clamp 16. The bungee cord 12 freely extends and recoils as the second cord end 14 is tethered with the connector plate 17.

The bungee clamp 15 is locked and unlocked with the telescopic bar 3 as the telescopic bar 3 may further comprise a track 8, and the first fastening mechanism 18 may comprise at least one first bolt 19, at least one first washer 22, at least one first nut 23, and at least one first hole 24, seen in FIG. 1, FIG. 2, FIG. 3, FIG. 4, and FIG. 5. The track 8 allows the at least one first bolt 19 and the at least one first washer 22 to connect with the telescopic bar 3 while traversing along the telescopic bar 3. More specifically, the at least one first bolt 19 may comprise a bolt shaft 20 and a bolt head 21. The at least one first nut 23 attaches with the bolt shaft 20 and tightens the bolt head 21 and the at least one first washer 22 against the telescopic bar 3, and consequently the bungee clamp 15 around the telescopic bar 3. At the least one first hole 24 preserves the structural integrity of the bungee clamp 15 while allowing the bolt shaft 20 to traverse through the bungee clamp 15. In order for the at least one first bolt 19 to securely connect the bungee clamp 15 with the telescopic bar 3, the bolt head 21 is positioned adjacent and concentric with the bolt shaft 20. Moreover, the bolt head 21 is terminally fixed onto the bolt shaft 20. The telescopic bar 3 readily receives the bungee clamp 15 as the track 8 is integrated into and along the inner tube 7. The at least one first hole 24 traverses through the square-shaped clamp 16, thereby allowing the at least one first bolt 19 to connect the bungee clamp 15 with the telescopic bar 3. As the square-shaped clamp 16 is positioned around the telescopic bar 3, the bolt head 21 and the at least one first washer 22 are positioned within the track 8. Moreover, the bolt shaft 20 is positioned through the at least one first washer 22 and through the at least one first hole 24. The at least one first nut 23 securely tightens the connection between the square-shaped clamp 16 and the telescopic bar 3 as the at least one first washer 22 is positioned in between the bolt head 21 and the square-shaped clamp 16. The at least one first bolt 19 and the at least one first washer 22 are slidably engaged along the track 8, thereby providing adjustable positions for the bungee clamp 15 and tension strengths for the bungee cord 12. A user is able to easily adjust the position and the tension as the at least one first nut 23 is laterally positioned with the square-shaped clamp 16. The at least one first nut 23 is threadably engaged with the bolt shaft 20, thereby allowing the bungee clamp 15 to be locked and unlocked across the telescopic bar 3.

The at least one length-adjustable stopper assembly 46 may further comprise a second fastening mechanism 28 so that a desired position of the inner tube 7 may be fixed within the outer tube 6 of the telescopic bar 3, seen in FIG. 3 and FIG. 5. The second fastening mechanism 28 therefore fixes the desired length of the telescopic bar 3. The length of the telescopic bar 3 is adjustable as the inner tube 7 is telescopically engaged within the outer tube 6. More specifically, the proximal bar end 4 is positioned coincident with the inner tube 7, opposite the outer tube 6. Conversely, the distal bar end 5 is positioned coincident with the outer tube 6, opposite the inner tube 7. The inner tube 7 is operatively coupled with the outer tube 6 by the second fastening mechanism 28, wherein the second fastening mechanism 28 is used to selectively lock and unlock the inner tube 7 in place along the outer tube 6, thereby providing an adjustable length for the telescopic bar 3.

Similar with the first fastening mechanism 18, the second fastening mechanism 28 may comprise at least one second bolt 29, at least one second washer 32, at least one second nut 33, and at least one second hole 35, seen in FIG. 5. The track 8 of the telescopic bar 3 allows the at least one second bolt 29 and the at least one second washer 32 to connect with the telescopic bar 3 while traversing along the telescopic bar 3. The at least one second bolt 29 may comprise a bolt shaft 30 and a bolt head 31. More specifically, the bolt head 31 is positioned adjacent and concentric with the bolt shaft 30. The at least one second nut 33 attaches with the bolt shaft 30 and tightens the bolt head 31 and the at least one second washer 32 against the telescopic bar 3, and consequently outer tube 6 around the inner tube 7. The at least one second hole 35 preserves the structural integrity of the outer tube 6 while allowing the bolt shaft 30 to traverse through the outer tube 6. In order for the at least one second bolt 29 to securely connect the outer tube 6 with the inner tube 7, the bolt head 31 is positioned adjacent and concentric with the bolt shaft 30. Moreover, the bolt head 31 is terminally fixed onto the bolt shaft 30. The inner tube 7 readily receives the outer tube 6 as the track 8 is integrated into and along the inner tube 7. The at least one second hole 35 laterally traverses through the outer tube 6, offset from the distal bar end 5, thereby allowing the at least one second bolt 29 to connect the outer tube 6 with the inner tube 7. As the outer tube 6 is positioned around the inner tube 7, the bolt head 31 and the at least one second washer 32 are positioned within the track 8. Moreover, the bolt shaft 30 is positioned through the at least one second washer 32 and through the at least one second hole 35. The at least one nut securely tightens the connection between the square-shaped clamp 16 and the telescopic bar 3 as the at least one second washer 32 is positioned in between the bolt head 31 and the outer tube 6. The at least one second bolt 29 and the at least one second washer 32 are slidably engaged along the track 8, thereby providing adjustable positions for the inner tube 7 within the outer tube 6. A user is able to easily adjust the position of the inner tube 7 as the at least one second nut 33 is laterally positioned with the outer tube 6. The at least one second nut 33 is threadably engaged with the bolt shaft 30, thereby allowing the inner tube 7 to be locked and unlocked within the outer tube 6.

In the preferred embodiment of the present invention, the at least one length-adjustable stopper assembly 46 may further comprise a cap 36, seen in FIG. 1, FIG. 2, FIG. 3, and FIG. 4. The cap 36 seals the stopper tube 9 and prevents any water from accumulating within the stopper tube 9. The cap 36 is mounted into the distal tube end 11 as the proximal tube end 10 is already sealed with the pole 25.

In the preferred embodiment of the present invention, the first cradle mount 37 and the second cradle mount 38 each comprise a fitted brace 39, a height-setting rod 40, and a second U-shaped bracket 41, seen in FIG. 1, FIG. 2, FIG. 3, and FIG. 4. The fitted brace 39 connects the telescopic bar 3 with the height-setting rod 40. The height-setting rod 40 offsets and connects the fitted brace 39 with the second U-shaped bracket 41. The U-shaped bracket connects the height-setting rod 40, and consequently the fitted brace 39, with a frame of a cradle mount or platform. In order to secure the at least one length-adjustable stopper assembly 46 with a cradle mount, the fitted brace 39 is laterally positioned about the telescopic bar 3, and the fitted brace 39 is frictionally engaged with the telescopic bar 3. The telescopic bar 3 is positioned onto the cradle mount as the fitted brace 39 is terminally attached to the height-setting rod 40, and the second U-shaped bracket 41 is terminally attached to the height-setting rod 40, opposite to the fitted brace 39. An opening 45 of the second U-shaped bracket 41 is oriented away from the telescopic bar 3, providing a continuous and uninhibited connection between the telescopic bar 3 and the cradle beam. The opening 45 provides the necessary space for a bar of the frame for the cradle beam to be positioned within the second U-shaped bracket 41. In the preferred embodiment of the present invention, the fitted brace 39 is oriented perpendicular with the second U-shaped bracket 41 as the telescopic bar 3 is positioned within the frame of the cradle beam so that the stopper tube 9 comes into contact with the bow of the boat.

Although the invention has been explained in relation to its preferred embodiment, it is to be understood that many other possible modifications and variations can be made without departing from the spirit and scope of the invention as hereinafter claimed.

What is claimed is:
1. A bow stop for boats comprising:
at least one length-adjustable stopper assembly;
the at least one length-adjustable stopper assembly comprising a telescopic bar, a stopper tube, a bungee cord, a first cradle mount, and a second cradle mount;
the telescopic bar comprising a proximal bar end and a distal bar end;
the stopper tube comprising a proximal tube end and a distal tube end;
the bungee cord comprising a first cord end and a second cord end;
the proximal tube end being hingedly mounted to the proximal bar end;

the first cord end being laterally mounted to the stopper tube, offset from the proximal tube end;
the second cord end being laterally mounted to the telescopic bar, offset from the proximal bar end;
the first cradle mount and the second cradle mount being laterally mounted with the telescopic bar;
the first cradle mount being positioned adjacent to the distal bar end; and,
the second cradle mount being positioned offset from the distal bar end.

2. The bow stop for boats as claimed in claim 1 comprising:
a length-adjustable cable;
the at least one length-adjustable stopper assembly being a left length-adjustable stopper assembly and a right length-adjustable stopper assembly;
the left length-adjustable stopper assembly being positioned offset with the right length-adjustable stopper assembly; and,
the stopper tube of the left length-adjustable stopper assembly being tethered to the stopper tube of the right length-adjustable stopper assembly by the length-adjustable cable.

3. The bow stop for boats as claimed in claim 2 comprising:
the at least one length-adjustable stopper assembly further comprising a tensioning junction anchor;
the tensioning junction anchor being laterally attached through the stopper tube, offset from the proximal tube end;
the first cord end being tethered to the tensioning junction anchor; and,
the tensioning junction anchor of the left length-adjustable stopper assembly being tethered to the tensioning junction anchor of the right length-adjustable stopper assembly by the length-adjustable cable.

4. The bow stop for boats as claimed in claim 2 comprising:
the length-adjustable cable further comprising a first circumference-adjustable loop and a second circumference-adjustable loop;
the first circumference-adjustable loop and the second circumference-adjustable loop being positioned opposite to each other along the length-adjustable cable;
the first circumference-adjustable loop being tethered to the stopper tube of the left length-adjustable stopper assembly; and,
the second circumference-adjustable loop being tethered to the stopper tube of the right length-adjustable stopper assembly.

5. The bow stop for boats as claimed in claim 1 comprising:
the at least one length-adjustable stopper assembly each further comprising a bungee clamp and a first fastening mechanism;
the telescopic bar further comprising an outer tube and an inner tube;
the inner tube being telescopically engaged within the outer tube;
the proximal bar end being positioned coincident with the inner tube, opposite the outer tube;
the distal bar end being positioned coincident with the outer tube, opposite the inner tube;
the bungee clamp being positioned in between the outer tube and the proximal bar end;
the bungee clamp being operatively coupled with the inner tube by the first fastening mechanism, wherein the first fastening mechanism is used to selectively lock and unlock the bungee clamp in place along the inner tube; and,
the second cord end being laterally attached to the inner tube by the bungee clamp.

6. The bow stop for boats as claimed in claim 5 comprising:
the at least one length-adjustable stopper assembly each further comprising a pole and a first U-shaped bracket;
the first U-shaped bracket being terminally fixed with the pole;
the pole being frictionally engaged into the proximal tube end;
the first U-shaped bracket being laterally positioned about the inner tube, offset from the bungee clamp; and,
the first U-shaped bracket being hingedly connected to the inner tube.

7. The bow stop for boats as claimed in claim 5 comprising:
the bungee clamp comprising a square-shaped clamp and a connector plate;
the square-shaped clamp being laterally positioned around the inner tube;
the square-shaped clamp being slidably engaged along the inner tube;
the connector plate being externally fixed with the square-shaped clamp; and,
the second cord end being tethered with the connector plate.

8. The bow stop for boats as claimed in claim 7 comprising:
the telescopic bar further comprising a track;
the first fastening mechanism comprising at least one first bolt, at least one first washer, at least one first nut, and at least one first hole;
the at least one first bolt comprises a bolt shaft and a bolt head;
the bolt head being positioned adjacent and concentric with the bolt shaft;
the bolt head being terminally fixed onto the bolt shaft;
the track being integrated into and along the inner tube;
the at least one first hole traversing through the square-shaped clamp;
the bolt head and the at least one first washer being positioned within the track;
the bolt shaft being positioned through the at least one first washer and through the at least one first hole;
the at least one first washer being positioned in between the bolt head and the square-shaped clamp;
the at least one first bolt and the at least one first washer being slidably engaged along the track;
the at least one first nut being laterally positioned with the square-shaped clamp; and,
the at least one first nut being threadably engaged with the bolt shaft.

9. The bow stop for boats as claimed in claim 1 comprising:
the at least one length-adjustable stopper assembly each further comprising a second fastening mechanism;
the telescopic bar further comprising an outer tube and an inner tube;
the inner tube being telescopically engaged within the outer tube;
the proximal bar end being positioned coincident with the inner tube, opposite outer tube;
the distal bar end being positioned coincident with the outer tube, opposite the inner tube; and, the inner tube being operatively coupled with the outer tube by the second fastening mechanism, wherein the second fastening mechanism is used to selectively lock and unlock the inner tube in place along the outer tube.

10. The bow stop for boats as claimed in claim 9 comprising:
the telescopic bar further comprising a track;
the second fastening mechanism comprising at least one second bolt, at least one second washer, at least one second nut, and at least one second hole;
the at least one second bolt comprises a bolt shaft and a bolt head;
the bolt head being positioned adjacent and concentric with the bolt shaft;
the bolt head being terminally fixed onto the bolt shaft;
the track being integrated into and along the inner tube;
the at least one second hole laterally traversing through the outer tube, offset from the distal bar end;
the bolt head and the at least one second washer being positioned within the track;
the bolt shaft being positioned through the at least one second washer and through the at least one second hole;
the at least one second washer being positioned in between the bolt head and the outer tube;
the at least one second bolt and the at least one second washer being slidably engaged along the track;
the at least one second nut being laterally positioned with the outer tube; and,
the at least one second nut being threadedly engaged with the bolt shaft.

11. The bow stop for boats as claimed in claim 1 comprising:
the at least one length-adjustable stopper assembly further comprising a cap; and,
the cap being mounted into the distal tube end.

12. The bow stop for boats as claimed in claim 1 comprising:
the first cradle mount and the second cradle mount each comprising a fitted brace, a height-setting rod, and a second U-shaped bracket;
the fitted brace being laterally positioned about the telescopic bar;
the fitted brace being frictionally engaged with the telescopic bar;
the fitted brace being terminally attached to the height-setting rod;
the U-shaped bracket being terminally attached to the height-setting rod, opposite to the fitted brace; and,
an opening of the U-shaped bracket being oriented away from the telescopic bar.

13. A bow stop for boats comprising:
at least one length-adjustable stopper assembly;
a length-adjustable cable;
the at least one length-adjustable stopper assembly comprising a telescopic bar, a stopper tube, a bungee cord, a first cradle mount, and a second cradle mount;
the telescopic bar comprising a proximal bar end and a distal bar end;
the stopper tube comprising a proximal tube end and a distal tube end;
the bungee cord comprising a first cord end and a second cord end;
the proximal tube end being hingedly mounted to the proximal bar end;
the first cord end being laterally mounted to the stopper tube, offset from the proximal tube end;
the second cord end being laterally mounted to the telescopic bar, offset from the proximal bar end;
the first cradle mount and the second cradle mount being laterally mounted with the telescopic bar;
the first cradle mount being positioned adjacent to the distal bar end;
the second cradle mount being positioned offset from the distal bar end;
the at least one length-adjustable stopper assembly being a left length-adjustable stopper assembly and a right length-adjustable stopper assembly;
the left length-adjustable stopper assembly being positioned offset with the right length-adjustable stopper assembly; and,
the stopper tube of the left length-adjustable stopper assembly being tethered to the stopper tube of the right length-adjustable stopper assembly by the length-adjustable cable.

14. The bow stop for boats as claimed in claim 13 comprising:
the at least one length-adjustable stopper assembly further comprising a tensioning junction anchor;
the tensioning junction anchor being laterally attached through the stopper tube, offset from the proximal tube end;
the first cord end being tethered to the tensioning junction anchor; and,
the tensioning junction anchor of the left length-adjustable stopper assembly being tethered to the tensioning junction anchor of the right length-adjustable stopper assembly by the length-adjustable cable.

15. The bow stop for boats as claimed in claim 13 comprising:
the length-adjustable cable further comprising a first circumference-adjustable loop and a second circumference-adjustable loop;
the first circumference-adjustable loop and the second circumference-adjustable loop being positioned opposite to each other along the length-adjustable cable;
the first circumference-adjustable loop being tethered to the stopper tube of the left length-adjustable stopper assembly; and,
the second circumference-adjustable loop being tethered to the stopper tube of the right length-adjustable stopper assembly.

16. The bow stop for boats as claimed in claim 13 comprising:
the at least one length-adjustable stopper assembly each further comprising a bungee clamp, a first fastening mechanism, a pole, and a first U-shaped bracket;
the telescopic bar further comprising an outer tube and an inner tube;
the bungee clamp comprising a square-shaped clamp and a connector plate;
the inner tube being telescopically engaged within the outer tube;
the proximal bar end being positioned coincident with the inner tube, opposite the outer tube;
the distal bar end being positioned coincident with the outer tube, opposite the inner tube;
the bungee clamp being positioned in between the outer tube and the proximal bar end;
the bungee clamp being operatively coupled with the inner tube by the first fastening mechanism, wherein the first fastening mechanism is used to selectively lock and unlock the bungee clamp in place along the inner tube;

the second cord end being laterally attached to the inner tube by the bungee clamp;

the first U-shaped bracket being terminally fixed with the pole;

the pole being frictionally engaged into the proximal tube end;

the first U-shaped bracket being laterally positioned about the inner tube, offset from the bungee clamp;

the first U-shaped bracket being hingedly connected to the inner tube;

the square-shaped clamp being laterally positioned around the inner tube;

the square-shaped clamp being slidably engaged along the inner tube;

the connector plate being externally fixed with the square-shaped clamp; and, the second cord end being tethered with the connector plate.

17. The bow stop for boats as claimed in claim 16 comprising:

the telescopic bar further comprising a track;

the first fastening mechanism comprising at least one first bolt, at least one first washer, at least one first nut, and at least one first hole;

the at least one first bolt comprises a bolt shaft and a bolt head;

the bolt head being positioned adjacent and concentric with the bolt shaft;

the bolt head being terminally fixed onto the bolt shaft;

the track being integrated into and along the inner tube;

the at least one first hole traversing through the square-shaped clamp;

the bolt head and the at least one first washer being positioned within the track;

the bolt shaft being positioned through the at least one first washer and through the at least one first hole;

the at least one first washer being positioned in between the bolt head and the square-shaped clamp;

the at least one first bolt and the at least one first washer being slidably engaged along the track;

the at least one first nut being laterally positioned with the square-shaped clamp; and, the at least one first nut being threadably engaged with the bolt shaft.

18. The bow stop for boats as claimed in claim 13 comprising:

the at least one length-adjustable stopper assembly each further comprising a second fastening mechanism;

the telescopic bar further comprising an outer tube and an inner tube;

the inner tube being telescopically engaged within the outer tube;

the proximal bar end being positioned coincident with the inner tube, opposite outer tube;

the distal bar end being positioned coincident with the outer tube, opposite the inner tube; and, the inner tube being operatively coupled with the outer tube by the second fastening mechanism, wherein the second fastening mechanism is used to selectively lock and unlock the inner tube in place along the outer tube.

19. The bow stop for boats as claimed in claim 18 comprising:

the telescopic bar further comprising a track;

the second fastening mechanism comprising at least one second bolt, at least one second washer, at least one second nut, and at least one second hole;

the at least one second bolt comprises a bolt shaft and a bolt head;

the bolt head being positioned adjacent and concentric with the bolt shaft;

the bolt head being terminally fixed onto the bolt shaft;

the track being integrated into and along the inner tube;

the at least one second hole laterally traversing through the outer tube, offset from the distal bar end;

the bolt head and the at least one second washer being positioned within the track;

the bolt shaft being positioned through the at least one second washer and through the at least one second hole;

the at least one second washer being positioned in between the bolt head and the outer tube;

the at least one second bolt and the at least one second washer being slidably engaged along the track;

the at least one second nut being laterally positioned with the outer tube; and, the at least one second nut being threadedly engaged with the bolt shaft.

20. The bow stop for boats as claimed in claim 13 comprising:

the at least one length-adjustable stopper assembly further comprising a cap;

the first cradle mount and the second cradle mount each comprising a fitted brace, a height-setting rod, and a second U-shaped bracket;

the cap being mounted into the distal tube end;

the fitted brace being laterally positioned about the telescopic bar;

the fitted brace being frictionally engaged with the telescopic bar;

the fitted brace being terminally attached to the height-setting rod;

the U-shaped bracket being terminally attached to the height-setting rod, opposite to the fitted brace; and, an opening of the U-shaped bracket being oriented away from the telescopic bar.

\* \* \* \* \*